United States Patent
Lee et al.

(10) Patent No.: US 11,438,039 B2
(45) Date of Patent: Sep. 6, 2022

(54) LIMITED-FEEDBACK METHOD AND DEVICE BASED ON MACHINE LEARNING IN WIRELESS COMMUNICATION SYSTEM

(71) Applicant: Korea University Research and Business Foundation, Seoul (KR)

(72) Inventors: Inkyu Lee, Seoul (KR); Jeong Hyeon Jang, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 163 days.

(21) Appl. No.: 16/933,467

(22) Filed: Jul. 20, 2020

(65) Prior Publication Data

US 2021/0250068 A1 Aug. 12, 2021

(30) Foreign Application Priority Data

Feb. 10, 2020 (KR) .......................... 10-2020-0015712

(51) Int. Cl.
*H04B 7/04* (2017.01)
*H04B 7/0456* (2017.01)
(Continued)

(52) U.S. Cl.
CPC .......... *H04B 7/0456* (2013.01); *G06F 17/18* (2013.01); *G06N 3/0472* (2013.01); *G06N 3/08* (2013.01); *H04B 7/0636* (2013.01)

(58) Field of Classification Search
CPC .. H04B 7/0456; H04B 7/0636; H04B 7/0639; H04B 7/063; H04B 7/0413;
(Continued)

(56) References Cited

U.S. PATENT DOCUMENTS

| 2014/0064109 A1* | 3/2014 | Krishnamurthy | .... H04B 7/0456 370/252 |
| 2015/0372727 A1* | 12/2015 | Ribeiro | ................ H04B 7/0619 375/267 |

(Continued)

FOREIGN PATENT DOCUMENTS

| CN | 110311718 A | 10/2019 |
| KR | 10-2016-0027721 A | 3/2016 |
| WO | WO 2019/045606 A1 | 3/2019 |

OTHER PUBLICATIONS

Korean Office Action dated Nov. 26, 2021 in corresponding Korean Patent Application No. 10-2020-0015712 (5 pages in Korean).
(Continued)

*Primary Examiner* — Dac V Ha
(74) *Attorney, Agent, or Firm* — NSIP Law

(57) ABSTRACT

Provided is a feedback method in a wireless communication system according to an embodiment of the present disclosure. The method includes enabling a receiver to acquire a reception signal vector including a channel component and a noise component, enabling the receiver to generate feedback information by performing one or more of the following on the reception signal vector: processing through one or more first layers; processing through a second layer, and processing through a quantization layer, and enabling the receiver to transmit the feedback information to a transmitter. In the feedback method, the quantization includes stochastic binarization.

17 Claims, 10 Drawing Sheets

(51) Int. Cl.
*H04B 7/06* (2006.01)
*G06N 3/04* (2006.01)
*G06N 3/08* (2006.01)
*G06F 17/18* (2006.01)

(58) Field of Classification Search
CPC .. H04B 7/0417; H04B 7/0418; H04B 7/0663; H04B 17/336; G06F 17/18; G06N 3/0472; G06N 3/08
See application file for complete search history.

(56) References Cited

U.S. PATENT DOCUMENTS

| | | | |
|---|---|---|---|
| 2018/0307950 A1* | 10/2018 | Nealis | G06N 3/063 |
| 2019/0123796 A1* | 4/2019 | Jin | H04B 7/0626 |
| 2020/0169311 A1 | 5/2020 | Ottersten et al. | |
| 2020/0228178 A1* | 7/2020 | Mittal | H04L 27/2613 |
| 2021/0226674 A1* | 7/2021 | Ramireddy | H04B 7/0632 |

OTHER PUBLICATIONS

Courbariaux, Matthieu, et al., "Binarized Neural Networks: Training Neural networks with Weights and Activations Constrained to+1 or−1," arXiv preprint arXiv:1602.02830, Mar. 17, 2016 (pp. 1-11).

Wen, Chao-Kai et al., "Deep Learning for Massive MIMO CSI Feedback," *IEEE Wireless Communications Letters* vol. 7, No. 5, Oct. 2018 (pp. 748-751).

Zhang, Chaoyun et al., "Deep Learning in Mobile and Wireless Networking: A Survey," *IEEE Communications surveys & tutorials*, vol. 21, No. 3, 2019 (pp. 2224-2287).

Korean Office Action dated Jun. 24, 2021 in counterpart Korean Patent Application No. 10-2020-0015712 (5 pages in Korean).

Liao et al., "CSI Feedback Based on Deep Learning for Massive MIMO Systems," Special Section on Artificial Intelligence for Physical-Layer Wireless Ommunications, IEEE Access, Jun. 24, 2019, vol. 7, pp. 86810-86820.

Jiang et al., "Deep Clustering-Based Codebook Design for Massive MIMO Systems," Special Section on Artificial Intelligence for Physical-Layer Wireless Communications, IEEE Access, Nov. 27, 2019, vol. 7, p. 172654-172664.

* cited by examiner

LIMITED-FEEDBACK METHOD AND DEVICE BASED ON MACHINE LEARNING IN WIRELESS COMMUNICATION SYSTEM

CROSS REFERENCE TO RELATED APPLICATION

The present application claims priority to Korean Patent Application No. 10-2020-0015712, filed on Feb. 10, 2020, the entire contents of which is incorporated herein for all purposes by this reference.

BACKGROUND OF THE INVENTION

Field of the Invention

The present disclosure relates to limited feedback in a wireless communication system and, more particularly, to a limited-feedback method and device based on machine learning.

Description of the Related Art

Communication systems employing multiple antennas or Multiple Input Multiple Output (MIMO) antennas are categorized into open loop and closed loop systems according to whether or not a receiver provides feedback to a transmitter. In the open loop system, the transmitter operates without information on a channel or channel status information (CSI) from the transmitter to the receiver. In the closed loop system, the transmitter operates with the CSI acquired from the receiver in consideration.

In the closed loop system, the CSI fed back by the receiver includes beamforming (or precoding) information (for example, precoding matrix index (PMI)). The beamforming means that a transmission stream to be transmitted by the transmitter is mapped to multiple antennas (or an antenna port). This mapping relationship is expressed by a beamforming matrix (or vector). The transmitter performs beamforming with reference to beamforming information fed back by the receiver.

The limited feedback refers to a feedback scheme in which the beamforming information to be fed back is limited to a range of sets of beamforming matrices that are shared between the transmitter and the receiver. A predefined set that is made up of one or more beamforming matrices is referred to as a codebook. One codebook includes one or more codewords. Each codeword corresponds to one beamforming matrix. That is, a feedback scheme using the codebook is referred to as limited feedback.

In a feedback scheme in the related art, the codebook is designed on the assumption that the receiver precisely secures the channel information. In a real word channel environment, due to ambient noise or a channel estimation error, there is a likelihood that the receiver will acquire distorted channel information. Therefore, the problem is that feedback on the distorted channel information is provided using the codebook designed on the assumption that channel information is precise.

SUMMARY OF THE INVENTION

An objective of the present disclosure is to provide a limited-feedback method and device in a wireless communication system, each of which results from considering a channel estimation error.

Another objective of the present disclosure is to provide a limited-feed method and device in a wireless communication system, in each of which a process of estimating explicit channel information is omitted.

Still another objective of the present disclosure is to provide a limited-feedback method and device in a wireless communication system, in each of which complexity of computation for channel information acquisition is reduced.

Still another objective of the present disclosure is to provide a limited-feedback method and device in a wireless communication system, each of which increases the quality of channel information that is fed back.

Technical problems that the present disclosure attempted to solve are not limited to the technical problems described above. From the legend "DETAILED DESCRIPTION OF THE INVENTION", it would be apparent to a person of ordinary skill in the art that there are other technical problems that are not mentioned.

According to an aspect of the present disclosure, there is provided a feedback method in a wireless communication system. The feedback method includes: enabling a receiver to acquire a reception signal vector including a channel component and a noise component; enabling the receiver to generate feedback information by performing at least one of the following on the reception signal vector: processing through at least one first layer; processing through a second layer; and processing through a quantization layer; or enabling the receiver to transmit the feedback information to a transmitter. In the feedback method, the quantization includes stochastic binarization.

According to another aspect of the present disclosure, there is provided a method of determining a codeword in a wireless communication system. The method includes: enabling a transmitter to transmit a signal to a receiver; enabling the transmitter to receive feedback information generated by the receiver from the receiver; and enabling the transmitter to generate a codeword by performing at least one of the following on the feedback information: processing through at least one third layer; processing through a fourth layer; or processing through a normalization layer. In the method, the feedback information is generated on the basis of a signal component, a channel component, and a noise component, which are transmitted from the transmitter to the receiver.

According to still another aspect of the present disclosure, there is provided a method of determining a codebook for feedback in a wireless communication system. The method includes: enabling a receiver to acquire a reception signal vector including a channel component and a noise component, on the basis of a signal received from a transmitter; enabling the receiver to generate feedback information by performing at least one of the following on the reception signal vector: processing through at least one first layer; processing through a second layer; or processing through a quantization layer; enabling the receiver to transmit the feedback information to the transmitter; and enabling the transmitter to generate a codeword by performing at least one of the following on the feedback information: processing through at least one third layer; processing through a fourth layer; or processing through a normalization layer. In the method, the codebook includes at least one codeword.

According to still another aspect of the present disclosure, there is a reception device that performs feedback in a wireless communication system. The reception device includes: a transceiver; an antenna unit; a memory; and a processor. In the reception device, the processor stores a reception signal vector including a channel component and a noise component, in the memory, on the basis of a signal received through the antenna unit and the transceiver, generates feedback information from the reception signal vector using at least one of the following: at least one first layer, a second layer, or a quantization layer, and sets the feedback information to be transmitted to the transmitter through the transceiver. In the reception device, the quantization includes stochastic binarization.

According to still another aspect of the present disclosure, there is provided a transmission device that determines a codeword in a wireless communication system. The transmission device includes a transceiver, an antenna unit, a memory, and a processor. In the transmission device, the processor transmits a signal from the transmission device to the receiver device through the transceiver and the antenna unit, receives feedback information generated by the reception device through the transceiver and stores the received feedback information in the memory, and sets a codeword to be generated from the feedback information using at least one of the following: at least one third layer, a fourth layer, or a normalization layer. In the transmission device, the feedback information is generated on the basis of a signal component, a channel component, and a noise component, which are transmitted from the transmission device to the reception device.

According to still another aspect of the present disclosure, there is provided a wireless communication system that determines a codebook for feedback. The wireless communication system includes a transmission device and a reception device. A processor of the reception device acquires a reception signal vector including a channel component and a noise component, on the basis of a signal received from the transmission device, generates feedback information from the reception signal vector using at least one of the following; at least one first layer, a second layer, or a quantization layer, and sets the feedback information to be transmitted to the transmission device. A processor of the transmission device sets a codeword to be generated from the feedback information using at least one of the following: at least one third layer, a fourth layer, or a normalization layer. In the wireless communication system, the codebook includes at least one codeword.

Features of the present invention, which are summarized above, are only exemplary aspects of the present disclosure and do not impose any limitation on the scope of the present disclosure.

According to the present invention, there are provided a limited-feedback method and device in a wireless communication system, which result from considering a channel estimation error.

According to the present disclosure, there are provided a limited-feedback method and device in a wireless communication system, in each of which a process of estimating explicit channel information is omitted.

According to the present disclosure, there are provided a limited-feedback method and device in a wireless communication system, in each of which complexity of computation for channel information acquisition is reduced.

According to the present disclosure, there are provided a limited-feedback method and device in a wireless communication system, each of which increases the quality of channel information that is fed back.

Advantages that are to be achieved according to the present disclosure are not limited to those described above. From the legend "DETAILED DESCRIPTION OF THE INVENTION", it would be apparent to a person of ordinary skill in the art that there are advantages that are not mentioned.

DETAILED DESCRIPTION OF THE INVENTION

Figure 1:
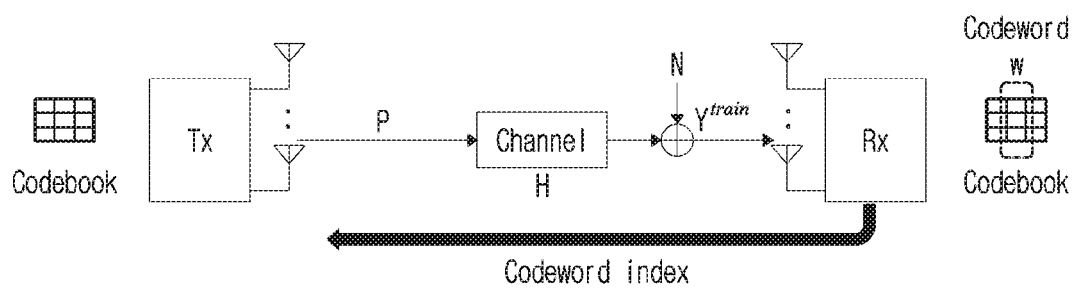
FIG. 1 is a diagram illustrating a limited-feedback system in which the present disclosure finds application.

Embodiments of the present disclosure will be described in detail below with reference to the accompanying drawings in such a manner that a person of ordinary skill in the art to which the present disclosure pertains is enabled to practice them without undue experimentation. However, the present disclosure can be implemented by modification, substitution, improvement, and the like and is not limited to the embodiments that will be described below.

When describing the embodiments of the present disclosure, in a case where detailed descriptions of configurations or functions known in the related art are determined to make the nature and gist of the present disclosure indefinite, the detailed descriptions thereof are omitted. Elements that do not relate to the description of the present disclosure are omitted from the drawings, and like elements are given like reference characters.

In the present disclosure, when a constituent element is referred to as being "connected to", being "combined with", and having "access to" one other constituent element, this means that the constituent element may be directly connected to one other constituent element or may be "indirectly connected to one other constituent with an intervening constituent element in between. When the expression "include a constituent element" or "have a constituent element" is used, unless otherwise described, this expression means "further include at least one other constituent element, not "exclude any other constituent element".

In the present disclosure, the terms "first", "second", and so on are used to distinguish one constituent element from another constituent element, and unless otherwise described, no limitation is imposed on the order of constituent elements or the importance of each constituent element. Therefore, a first constituent element according to an embodiment within the scope of the present disclosure may be referred to as a second constituent element according to another embodiment. Similarly, a second constituent element according to an embodiment may be referred to as a first constituent element according to another embodiment.

In the present disclosure, the use of the terms "first", "second", and so on serves to definitely describe features of each of the distinguishable constituent elements and does not mean that constituent elements are necessarily separated from each other. That is, multiple constituent elements may be integrated into one piece of hardware or one piece of software, and one constituent element may be separated into multiple pieces of hardware or multiple pieces of software. Therefore, although not specifically mentioned, an embodiment resulting from the integration or an embodiment resulting from the separation falls within the scope of the present disclosure.

In the present disclosure, constituent elements according to various embodiments are not necessarily intended to be essential constituent elements, and one or several thereof may be selected. Therefore, another embodiment including constituent elements, selected from among constituent elements that are described below and which constitute an embodiment, also falls within the scope of the present disclosure. In addition, an embodiment, which results from adding one or more constituent elements to constituent elements that constitute various embodiments described below, also falls within the scope of the present disclosure.

The present disclosure relates to communication between network nodes in a wireless communication system. Network nodes include at least one of the following: a base station, a terminal, or a relay. The term base station (BS) is used interchangeably with the terms fixed station, Node B, eNodeB (eNB), ng-eNB, gNodeB (gNB), access point (AP), and so on. The term terminal is used interchangeably with the terms user equipment (UE), mobile station (MS), mobile subscriber station (MSS), subscriber station (SS), non-AP station (non-AP STA), and so on.

The wireless communication system may support communication between a base station and a terminal or may support inter-terminal communication. Downlink (DL) in the communication between the base station and the terminal refers to communication from the base station to the terminal. Uplink (UL) refers to communication from the terminal to the base station. For the inter-terminal communication, various communication schemes or services are used, such as device-to-device (D2D), vehicle-to-everything (V2X), a proximity service (ProSe), and sidelink communication. Terminals for the inter-terminal communication include a sensor node, a vehicle, a disaster alarm, and so on.

In addition, a wireless communication system includes a relay and a relay node (RN). In a case where a relay finds application in the communication between the base station and the terminal, the relay serves as a base station communicating with a terminal and also serves as a terminal communicating with a base station. On the other hand, in a case where the relay finds application in the inter-terminal communication, the relay serves as a base station communicating with each of the terminals.

The present disclosure finds application in various multi-access schemes for the wireless communication system. Examples of the multi-access scheme include Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, OFDM-CDMA, Non-Orthogonal Multiple Access (NOMA), and so on. In addition, a wireless communication system in which the present disclosure finds application may support a Time Division Duplex (TDD) scheme that uses the respective distinctive time resources for uplink communication unit and downlink communication and may support a Frequency Division Duplex (FDD) scheme that uses the respective distinctive frequency resources for uplink communication and downlink communication.

According to the present disclosure, the expression "transmit or receive a channel" has the meaning of "transmit or receive information or a signal over a channel". For example, the expression "transmit a control channel" has the meaning of "transmit control information or a control signal over a control channel". Similarly, the expression "transmit data channel" has the meaning of "transmit data information or a data signal over a data channel".

Embodiments of the present disclosure that is directed to limited feedback based on a learning machine will be described below.

FIG. 1 is a diagram illustrating a limited-feedback system in which the present disclosure finds application.

In a multi-antenna communication system (or a MIMO antenna system), information relating to a channel between a transmitter and a receiver needs to be shared to take advantage of multiple antennas. To this end, the receiver determines channel information using a signal received from the transmitter and then feeds the determined channel information back to the transmitter.

As an amount of feedback information increase, the resource available for user data transmission becomes insufficient. This requires a method of reducing feedback information overhead. For example, a feedback scheme utilizing a limited frequency bandwidth may be applied, and a limited-feedback scheme using a codebook may is applied.

In the wireless communication system employing the limited-feedback scheme, the transmitter Tx and the receiver Rx share a predefined codebook. In this case, the transmitter transmits a pilot signal (or a reference signal) to the receiver through Nt antennas. The pilot signal corresponds to a signal in a predefined pattern, which is shared between the transmitter and the receiver. It is assumed that the pilot signal has a length of L.

The pilot signal is transmitted by the transmitter over channel H. Then the pilot signal to which noise N is added during the transmission over channel H is received by the receiver through Nr antennas. Channel estimation is performed on channel H using $Y^{train}$ that results from a pattern of the pilot signal known in advance to the receiver changing due to channel H and noise N.

The receiver selects codeword w from a codebook on the basis of the estimated channel information. At this point, the receiver selects a codeword with which an effective channel gain is maximized.

The receiver transfers information or a codeword index indicating the selected codeword w to the transmitter over a feedback channel. The transmitter determines a codeword corresponding to the codeword index fed back by the receiver from a codebook and performs transmission on the basis of the determined codeword. However, the transmitter only refers to the information fed back by the receiver and is not necessarily required to exactly comply with the information fed back by the receiver.

In the limited-feedback system as described above, codebook design exerts an influence on feedback quality. For improvement in the feedback quality, research has been conducted, for example, on codebook design for a single user, codebook design that reflects a correlation between the respective antennas of the transmitter and the receiver, codebook design for general application, and the like. In addition, recently, discussion has focused on a feedback scheme and the like that are based on machine learning utilized in the artificial intelligence field. For example, a feedback scheme in a massive Multiple-Input Multiple-Output (MIMO) antenna system, a feedback scheme for a time variant channel, a new machine learning technology for improvement in performance, a scheme for increasing feedback performance in a feedback situation where delay and an error occur, and the like have been proposed.

These feedback schemes in the related art are based on the assumption that all receivers can secure precise and complete channel information. However, in real word situations, there is a likelihood that the receiver will obtain channel information distorted due to ambient noise (that is, a likelihood that a channel estimation error will occur). In a case where the channel information distorted due to the channel estimation error is obtained, there occurs a decrease in performance of the feedback that uses a codebook designed on the assumption that channel information is precise. In addition, it takes much time to acquire information relating to a channel of which the complexity increases with an increase in the number of antennas, and computational complexity increases in a process of acquiring channel information.

According to embodiments of the present disclosure, limited-feedback systems employing a new scheme are described. The new scheme results from designing a codebook that is applicable even in a situation where the channel estimation error occurs (or from designing a codebook without estimating explicit channel information). With the new scheme, the feedback quality is improved and the computational complexity in the limited-feedback system is reduced.

Figure 2:
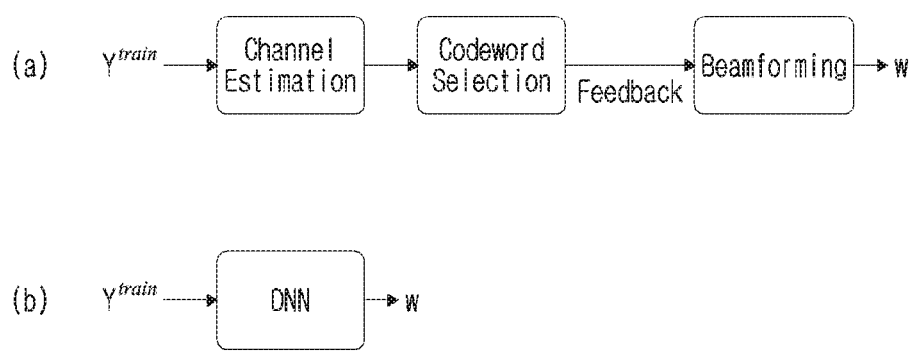
FIG. 2 is a diagram illustrating a codebook design scheme in which the present disclosure finds application.

FIG. 2 is a diagram illustrating a codebook design scheme in which the present disclosure finds application.

As illustrated in (a) of FIG. 2, in a limited-feedback system in the related art, channel estimation is performed using signal $Y^{train}$ received by a receiver, a codeword is selected on the basis of a channel estimated by the receiver, and the selected codeword is fed back to a transmitter. In addition, the transmitter performs beamforming on the basis of the feedback information from the receiver and accordingly determines suitable beamforming matrix (or vector) w. The beamforming matrix that is determined in this manner is used as a codeword to be included in a codebook.

In the limited-feedback system in the related art, there is a limitation in that, because each process is divided into blocks on the assumption of a linear system, a relationship between input $Y^{train}$ (that is, a reception signal) and output w (that is, a codeword) is difficult to derive.

In the limited-feedback system based on a machine learning, which is illustrated in (b) of FIG. 2, an entire process is analogous to a single black box. For example, the black box is expressed as a deep neural network algorithm. Accordingly, a direct nonlinear relationship between input $Y^{train}$ (that is, a reception signal) and output w (that is, a codeword) is derived.

According to the present disclosure, it is assumed that the transmitter includes Nt (Nt is an integer that is equal to greater than 2) antennas and that the receiver includes Nr (Nt is an integer that is equal to or greater than 2) antennas. In addition, it is assumed that, using an FDD scheme, the transmitter transmits information and the receiver receives information. However, these assumptions are only for clear description and do not impose any limitation on the scope of the present disclosure. The principle behind the present disclosure also applies, in the same manner, in a case where the transmitter or the receiver includes one or more antennas and in a system that supports the TDD scheme.

In the wireless communication system with this configuration, in order to derive beamforming vector w that is to be applied according to channel H, a signal at the receiver receiving data information from the transmitter, is expressed as in Equation 1.

$$y^{data} = \sqrt{E_s}Hs + n^{data} \quad \text{Equation 1}$$

$$s = wx$$

where $y^{data}$ denotes a reception signal of data information, Es denotes a transmission power of the data information, H denotes a channel, s denotes a transmission signal, $n^{data}$ denotes noise, and x denotes the data information transmitted from a transmitter. That is, transmission signal s is expressed as the product of data information x transmitted by the transmitter and beamforming vector w.

A method of efficiently determining beamforming vector w on the basis of a model such as Equation 1 will be described below.

First, the channel information is determined using a signal (for example, a pilot signal) that is preset between the transmitter and the receiver, and the pilot signal received by the receiver from the transmitter is expressed in Equation 2. Equation 2 is an expression that results from adding the received pilot signals in the form of a matrix.

$$Y^{train} = \sqrt{E_p}HP + N \quad \text{Equation 2}$$

where $Y^{train}$ denotes a received signal matrix of a pilot, Ep denotes a transmission signal power of a pilot, H denotes a channel matrix, P denotes a transmission signal matrix of a pilot, and N denotes a noise matrix.

As described above, according to the present disclosure, feedback that results from considering the channel estimation error is supported. More specifically, in the limited-feedback scheme in the related art, the feedback information is configured on the assumption that channel information is precise or complete, and thus it is assumed that a reception signal itself does not include a noise component. On the other hand, according to the present disclosure, it is assumed that the reception signal includes a noise component as in Equation 1 or Equation 2. Accordingly, according to the present disclosure, the precise or complete channel information itself may not be derived. That is, in examples in the present disclosure, a process of estimating explicit channel information is omitted. For example, in an existing minimum mean square error (MMSE) channel estimation scheme, explicit channel information is estimated. However, according to the present disclosure, feedback information on an entire reception signal including a channel component and a noise component is derived without determining which portion of the reception signal is the channel component and which portion is the noise component.

As described above, a machine learning technique (for example, a deep learning technique) applies to the reception signal including both the channel component and the noise component, thereby obtaining a beamforming vector.

A deep neural network (DNN) model, as an example of the machine learning technique, finds application in the present disclosure. However, the scope of the disclosure is not limited to the DNN model, and the principle behind the present disclosure may apply to a similar machine learning technique.

The DNN model is created, on the basis of a human neural network, in the computer science field, and is a model that is made up of various layers that serve as human neurons. A middle layer other than input and output layers is referred to as a hidden layer, and an output of m-th hidden layer is expressed as in Equation 3.

$$x_m = a_m(W_m x_{m-1} + o_m) \quad \text{Equation 3}$$

where $x_m$ denotes an output of an m-th layer, $a_m$ denotes an activation function, $W_m$ denotes a weighting factor, and $o_m$ denotes a bias. That is, the output of the m-th layer is expressed as an output of the activation function of which an input is a value that is obtained by adding a bias of the m-th layer to a result of applying a weighting factor of the m-th layer to an output of an (m−1)-th layer.

A nonlinear relationship between an input and an output, which is difficult to express mathematically, is approximated using the DNN model that includes various layers and various nonlinear activation functions, and a problem that is difficult to solve theoretically can be solved accordingly.

According to the present disclosure, an attempt was made to solve a feedback problem with the channel estimation error in consideration. The feedback problem is difficult to solve with an existing communication theory in which a channel estimation and feedback process is first required to be expressed, in a divided manner, into a linear relationship equation. Therefore, according to the present disclosure, examples are described in which nonlinear relation between reception signal $Y^{train}$ and beamforming vector (or codeword) w that results from feedback is found using the DNN.

Figure 3:
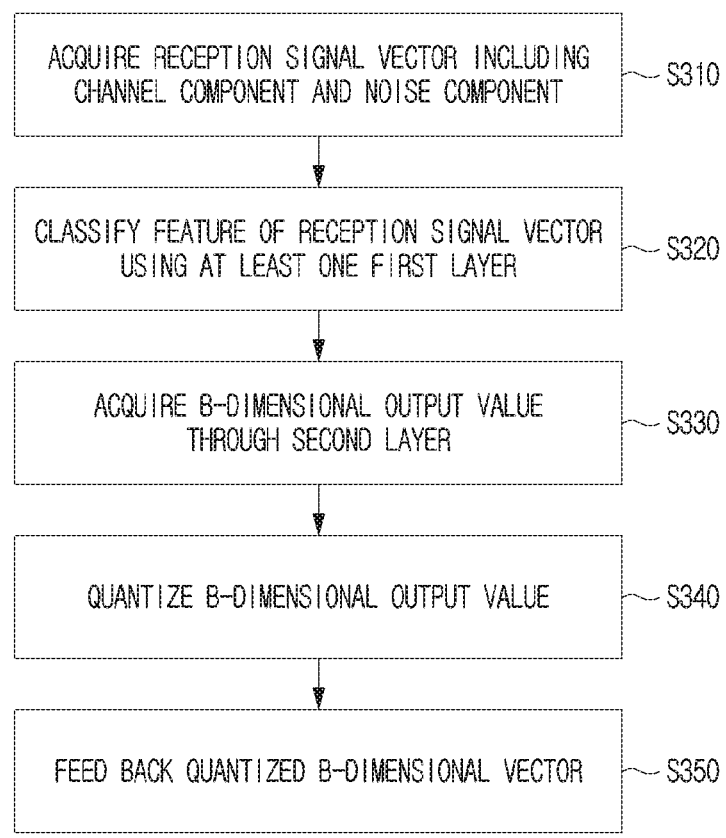
FIG. 3 is a flowchart illustrating operation of a receiver for codebook design in which the present disclosure finds application.

FIG. 3 is a flowchart illustration operation of the receiver for the codebook design in which the present disclosure finds application.

In Step S310, the receiver acquires a reception signal vector that includes the channel component and the noise component.

For example, the receiver acquires reception signal vector $y^{train}$ from reception signal matrix $Y^{train}$ as expressed in Equation 2. More specifically, at an input layer of the DNN model of the receiver, a matrix input value $Y^{train}$ is vectorized into a real part vector and an imaginary part vector, and the result of the vectorization is transferred to at least one first layer that follow.

In Step S320, the receiver categories features of the reception signal vector using at least one first layer.

For example, the first layer is a fully connected layer (FC layer). More specifically, the first layer is an FC layer that has a rectified linear unit (ReLU) function as an activation function. For example, the ReLU unit function is expressed in Equation 4.

$$a_m(z) \triangleq \max\{0, z\} \quad \text{Equation 4}$$

As expressed in Equation 4, the ReLU function is defined as a function in which, when an input value exceeds 0, the input value is output as is, and in which, when an input value is equal to or smaller than 0, 0 is output.

In Step S330, the receiver acquires a B-dimensional output value through a second layer.

Specifically, the second layer converts at least one output value of the first layer into B-dimensional output values, and thus stochastic binarization is applicable.

According to the present disclosure, the receiver finally transfers binarized feedback information to the transmitter. Variables (or DNN parameters) within a neural network are updated by gradient descent. However, a gradient value in the binarization is 0, and thus variables are impossible to update simply. To solve this problem, according to the present disclosure, stochastic binarization is performed.

The stochastic binarization includes performing quantization to one of the first value and the second value on the basis of the probability that a value ranging from the first value to the second value will become the first value or the second value.

For example, the second layer is an FC layer that has a nonlinear function as an activation function. The nonlinear function here is a function that is derived from a sigmoid function. More specifically, the nonlinear function is a hyperbolic tangent (tanh) function.

At this point, a dimension of an output value of the second layer is fixed to B. Accordingly, $2^B$ output values are acquired. For example, an output of the tan h function has a value that ranges from −1 to +1. Accordingly, an output value of the second layer has the probability of ranging from −1 to +1.

In Step S340, the receiver quantizes a B-dimensional output value.

For example, when one of $2^B$ output values (that is, input values of a quantization function in Step S340) in Step S330 is defined as z, z has a value in a continuous range from −1 to +1. At this point, an output value of b(z) is acquired through a process of quantifying z. B(z) is expressed as in Equation 5.

$$b(z) = z + e, \text{ for } z \in [-1, 1] \quad \text{Equation 5}$$

$$e = \begin{cases} 1 - z, & \text{with probability } \dfrac{1+z}{2} \\ -1 - z, & \text{with probability } \dfrac{1-z}{2} \end{cases}$$

Accordingly, a quantized output value (that is, a quantized B-dimensional vector) in the form of a vector with a length of $2^B$ is acquired. The quantized output value has the form of a vector with a value of −1 or a value of +1.

In this manner, the stochastic binarization is performed through two steps, S330 and S340.

In Step S350, the receiver feeds the quantized B-dimensional vector back to the transmitter. At this point, a value of each element of the B-dimensional vector corresponds to one of the first or second value, and thus the value of each element is expressed as a bit value. For example, feedback information with a B-bit length (or a bit string with a length of B) is transferred from the receiver to the transmitter.

Figure 4:
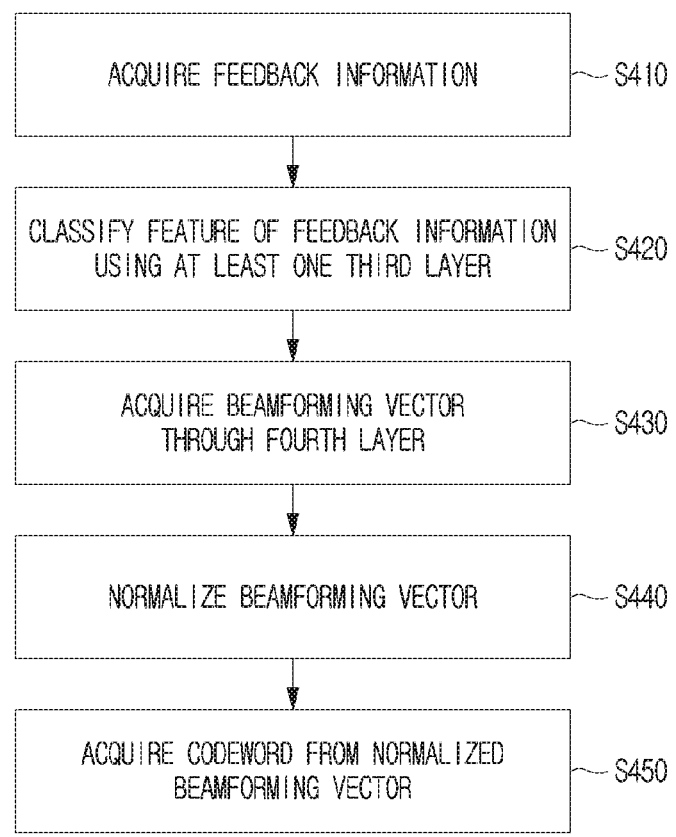
FIG. 4 is a flowchart illustrating operation of a transmitter for the codebook design in which the present disclosure finds application.

FIG. 4 is a flowchart illustrating operation of the transmitter for the codebook design in which the present disclosure finds application.

In Step S410, the transmitter acquires the feedback information.

The feedback information here corresponds to the B-dimensional vector quantized in the receiver. In addition, it is assumed that the feedback channel is a noise- or error-free channel. That is, the transmitter acquires the feedback information derived in the receiver, without loss.

In Step S420, the transmitter classifies features of the feedback information using at least one third layer.

For example, the third layer is an FC layer. More specifically, the third layer is an FC layer that has a ReLU function as an activation function.

In Step S430, the transmitter acquires a beamforming vector through the fourth layer.

For example, the fourth layer is an FC layer. More specifically, the fourth layer is an FC layer that has a linear function as an activation function. For example, by applying the linear function, a case where output values of at least one third layer are negative values is filtered out. Accordingly, the beamforming vector is converted into a vector that does not have a negative value.

In Step S440, the transmitter normalizes the beamforming vector.

The normalization is performed to meet conditions for the beamforming in order to increase a learning speed of a neural network. For example, the normalization includes converting an input value in such a manner that a norm value of the beamforming is a predetermined value (for example, 1).

In Step S450, the transmitter acquires a codeword from the normalized beamforming vector.

For example, the normalized beamforming factor that is the output value in Step S440 is expressed as $\tilde{w}$. At this point, codeword w is finally acquired using a relationship expressed as Equation 6.

$$\tilde{w}=[\mathcal{R}\{w\} \mathcal{I}\{w\}] \qquad \text{Equation 6}$$

According to Equation 6, codeword w that is a complex beamforming vector is derived from a real part vector and an imaginary part vector of the normalized beamforming vector.

Figure 5:
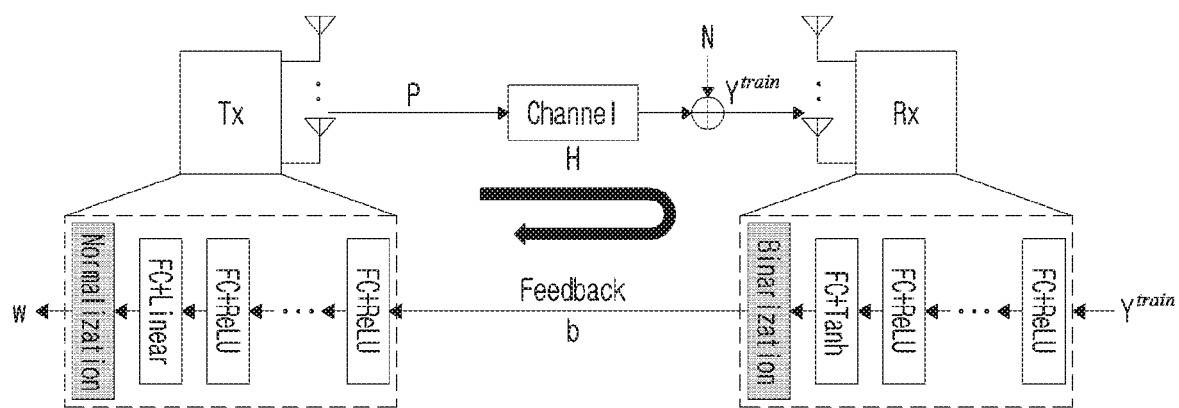
FIG. 5 is a diagram illustrating a DNN model for the codebook design in which the present disclosure finds application.

FIG. 5 is a diagram illustrating the DNN model for the codebook design in which the present disclosure finds application.

Pilot signal P is transmitted from the transmitter Tx over channel H, and noise N is added to pilot signal P during the transmission over channel H. Then, resulting pilot signal P is received, as signal $Y^{train}$, in the receiver Rx.

In the receiver Rx, reception signal $Y^{train}$ passes, as an input value, through at least one first layer (for example, FC layers each having a ReLU function as an activation function). Then, the resulting output value passes through the second layer (for example, an FC layer having a tank function as an activation layer). Then, an output value that goes through the quantization process is output. Accordingly, the quantized B-dimensional vector is fed, as feedback information b, back to the transmitter Tx.

In the transmitter Tx, feedback information b passes, as an input value, through at least one third layer (for example, FC layers each having a ReLU function as an activation layer). The resulting output value passes through a fourth layer (for example, an FC layer having a linear function as an activation function). An output value that goes through the normalization process is output. Accordingly, codeword w is derived from the normalized beamforming vector.

These processes are iterated, and thus a codebook including at least one codeword is determined.

In this manner, through the model according to the present disclosure, the beamforming vector, which results from considering the channel estimation error (that is, which results from not estimating the explicit channel information), is derived from the reception signal in the receiver.

A method of training the DNN model as described above will be described below.

In the following description, $\theta_R$ denotes a collection of variables (or reception parameters) that are used for computation by the receiver, and $\theta_T$ denotes a collection of variables (or transmission parameters) that are used for computation by the transmitter. In addition, $g_R$ denotes a function representing a relationship between an input and an output in the receiver, and $g_T$ denotes a function representing a relationship between an input and an output in the transmitter.

A mapping relationship between $y^{train}$ and output b in the receiver is expressed as in Equation 7, and $y^{train}$ means a complex vector made up of a real part vector and an imaginary part vector of $y^{train}$. In the transmitter, a mapping relationship between input b and output w is expressed as in Equation 8, and accordingly, a mapping relationship between input $y^{train}$ and output w of the entire DNN model is expressed as in Equation 9.

$$b=g_R(\tilde{y}^{train};\theta_R) \qquad \text{Equation 7}$$

$$w=g_T(b;\theta_T) \qquad \text{Equation 8}$$

$$w=g_T(g_R(\tilde{y}^{train};\theta_R);\theta_T) \qquad \text{Equation 9}$$

According to the present disclosure, a neural network is trained in order to maximize a channel gain that is an index indicating performance of the beamforming vector for a single user. The channel gain is expressed as in Equation 10.

$$\|Hw\|_2^2 \qquad \text{Equation 10}$$

$$\|x\|_2^2 \triangleq (\sqrt{x_1^2+\ldots+x_n^2})^2$$

When Equation 9 representing w is substituted into Equation 10, the result is expressed as in Equation 11.

$$\|Hg_T(g_R(\tilde{y}^{train};\theta_R);\theta_T)\|_2^2 \qquad \text{Equation 11}$$

The maximization of the channel gain in Equation 11 is expressed as Equation 12.

$$\max_{\theta_T,\theta_R}\mathbb{E}_{H,N}[\|Hg_T(g_R(\tilde{y}^{train};\theta_R);\theta_T)\|_2^2] \qquad \text{Equation 12}$$

where E denotes an effective channel gain for channel H and noise N.

The method of training the neural network is performed while updating variables through gradient descent. For example, B pairs of channel H and noise N are generated each time training is performed, and the channel gain is computed. Then, a gradient for each variable is computed. Then, a stochastic gradient descent (SGD) that updates variables at a constant ratio is applied. This is expressed as in Equation 13.

$$\Theta^{[q]} = \Theta^{[q-1]} + \frac{\eta}{|\mathcal{B}|}\sum_{(H,N)\in\mathcal{B}}\nabla\|Hg_T(g_R(\tilde{y}^{train};\theta_R);\theta_T)\|_2^2 \qquad \text{Equation 13}$$

where $\nabla$ denotes a gradient, and q denotes the number of times of iteration (that is, q-th iteration). That is, $\Theta^{[q]}$ denotes a collection of variables that are used for neural network computation at the q-th iteration.

A value of b(z) in Equation 5 in the binarization process in the receiver is a discontinuous value according to probability, and thus the gradient descent cannot apply. When applying the gradient descent to the binarization process, variables are updated using the gradient estimated as in Equation 14.

$$\nabla_{\theta_R}b(z)\approx\nabla_{\theta_R}\mathbb{E}_e[z+e|z]=\nabla_{\theta_R}z \qquad \text{Equation 14}$$

where E denotes an estimated value of quantization noise e.

Figure 6:
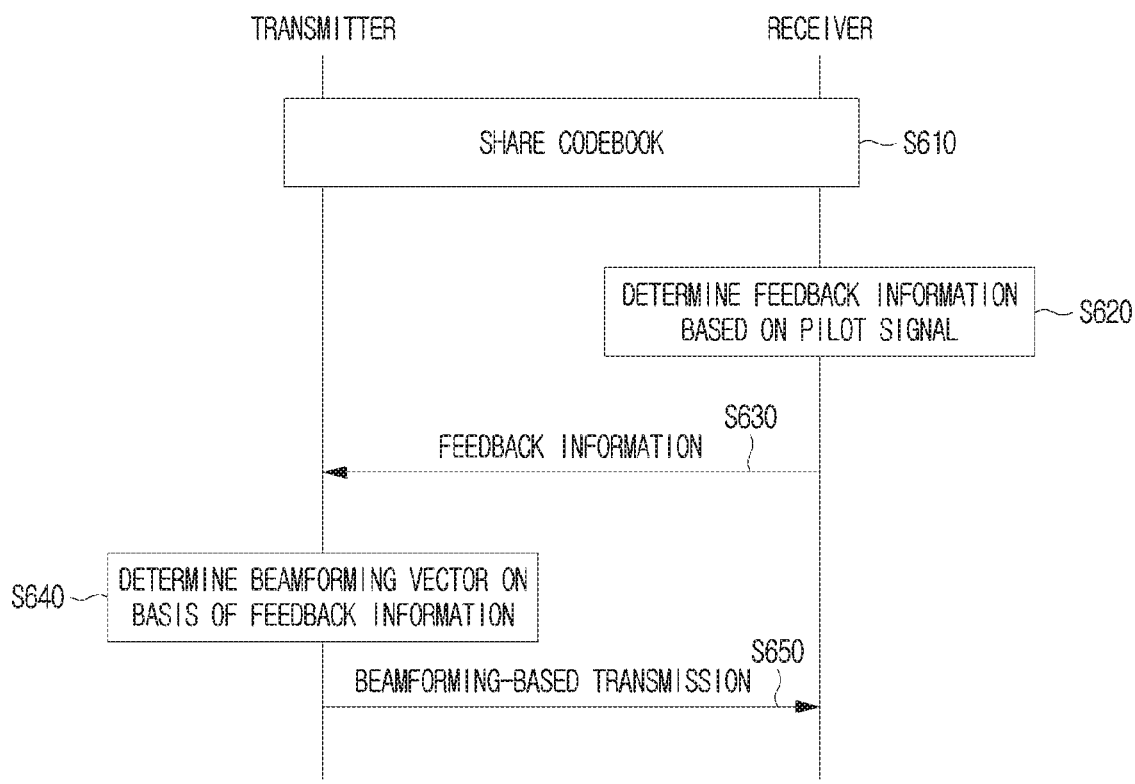
FIG. 6 is a flowchart illustrating a method of performing limited feedback on the basis of a codebook designed according to the present disclosure.

FIG. 6 is a flowchart illustrating a method of performing limited feedback on the basis of the codebook designed according to the present disclosure.

In Step S610, the transmitter and the receiver share the codebook.

For example, as described with reference to FIGS. 3 and 4, the receiver generates feedback information b from reception signal $y^{train}$ and transfers the generated feedback information to the transmitter. The transmitter determines a beamforming vector or codeword w from feedback information b. This process is iterated and thus neural network training is performed. When the neural network training is completed, receiver parameter $\theta_R$ and transmitter parameter $\theta_T$ are determined. The receiver and transmitter parameters that are determined in this manner are shared between the receiver and the transmitter.

The neural network training here corresponds to an offline process. The process of completing the neural network training, that is, a process in which the transmitter and the receiver share the neural network parameter, may be expressed as a process of sharing a predetermined codebook. In a situation where the codebook or the neural network parameter is predetermined in this manner, the receiver performs limited feedback, and the transmitter performs beamforming-based transmission on the basis of the feedback information.

Therefore, when completing the neural network training and then applying the limited-feedback system (or during an online process) the computational complexity in a neural network training process may not be considered.

In Step S620, the transmitter transmits a pilot signal to the receiver.

In Step S630, the receiver determines the feedback information on the basis of the pilot signal received from the transmitter.

For example, the receiver generates feedback information b according to the operation described with reference to FIG. 3. That is, when completing the neural network training and then applying the limited-feedback system, the receiver again performs neural network computation and thus determines the feedback information.

In Step S640, the receiver transfers the feedback information to the transmitter.

In Step S650, the transmitter determines a beamforming vector on the basis of the feedback information received from the receiver.

For example, the transmitter determines the beamforming vector or codeword w, which corresponds to feedback information b, using Equation 8. This process is a process in which the transmitter simply selects a codeword corresponding to a vector with a length of $2^B$, which is fed back from the receiver, without again performing the neural network computation as in FIG. 4.

For example, the transmitter may configure a lookup table based on a one-to-one mapping relationship between feedback information b and beamforming vector w.

Therefore, when completing the neural network training and then applying the limited-feedback system, the neural network computation is not needed in the transmitter. Therefore, when applying the limited-feedback system, the computational complexity in the transmitter may not be considered.

In Step S660, the transmitter performs the beamforming-based transmission.

For example, the transmitter may use the beamforming vector determined in Step S650 on the basis of the feedback information, without any change thereto, but may determine a different beamforming vector as an optimal beamforming vector. The transmitter applies the beamforming vector determined in this manner, for transmission to the receiver.

Figure 7:
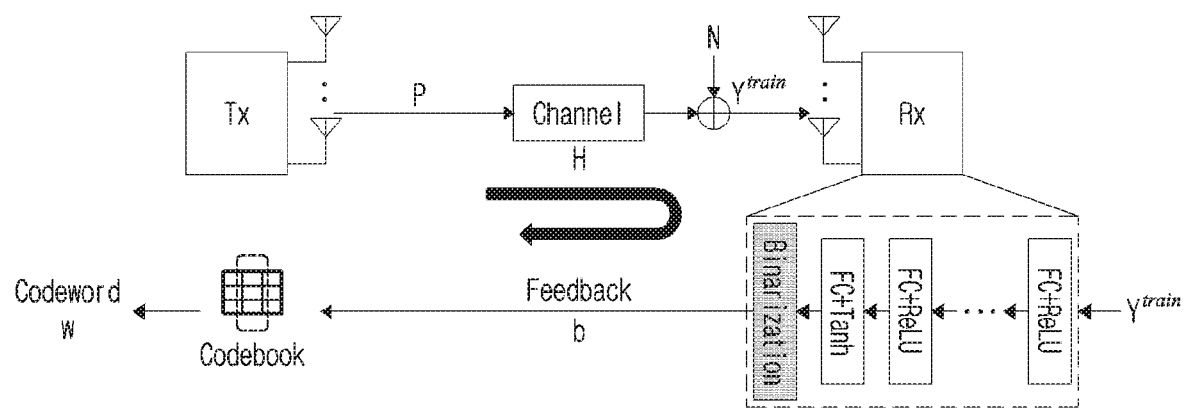
FIG. 7 is a diagram illustrating operation of the limited-feedback system in which the present disclosure finds application.

FIG. 7 is a diagram illustrating operation of the limited-feedback system in which the present disclosure finds application.

Pilot signal P is transmitted from the transmitter Tx over channel H, and noise N is added to pilot signal P during the transmission over channel H. Then, resulting pilot signal P is received, as signal $Y^{train}$, in the receiver Rx.

In the receiver Rx, reception signal Ytrain passes, as an input value, through at least one first layer (for example, FC layers each having a ReLU function as an activation function). Then, the resulting output value passes through the second layer (for example, an FC layer having a tank function as an activation layer). Then, an output value that goes through the quantization process is output. Accordingly, the quantized B-dimensional vector is fed, as feedback information b, back to the transmitter Tx.

The transmitter Tx selects codeword w corresponding to feedback information b, using a predetermined codebook (or a neural network parameter that is predetermined by the transmitter and the receiver. For example, the codebook may be made up of the lookup table based on the one-to-one mapping relationship between feedback information b and codeword w.

The transmitter Tx performs transmission to the receiver Rx on the basis of the selected codeword or beamforming vector w.

In the examples of the present disclosure, the feedback quality is increased even in a poor channel estimation environment where the channel estimation error occurs, and thus the quality of the multi-antenna communication is increased. In addition, the explicit channel information does not need to be not estimated. This reduces the computational complexity in the entire system. Particularly, in the examples of the present disclosure, the complexity in implementation of the FDD system in which a limited frequency bandwidth is required to be utilized is reduced, and the communication quality is improved.

Figure 8:
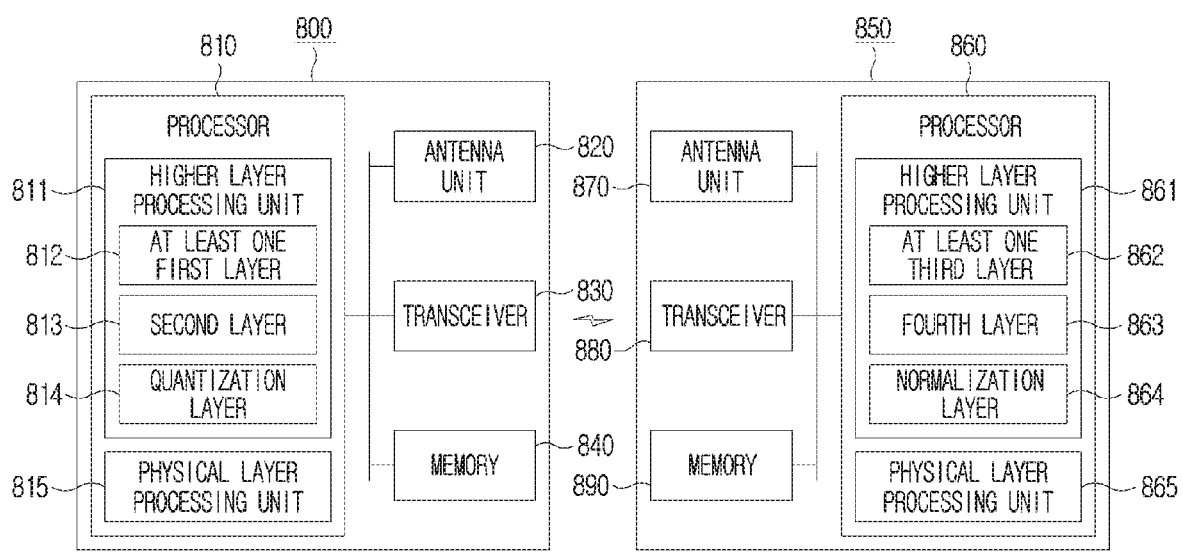
FIG. 8 is a diagram illustrating the respective configurations of a reception device and a transmission device according to the present disclosure.

FIG. 8 is a diagram illustrating the respective configurations of a reception device and a transmission device according to the present disclosure.

The reception device 800 includes a processor 810, an antenna unit 820, a transceiver 830, and a memory 840.

The processor 810 performs signal processing associated with a baseband and includes a higher layer processing unit 811 and a physical layer processing unit 815. The higher layer processing unit 811 performs processing associated with a MAC layer, an RRC layer, and a layer higher than these layers. The physical layer processing unit 815 performs processing (for example, transmission/reception signal processing and the like over uplink/downlink/sidelink) associated with a PHY layer. In addition to performing the signal processing associated with the baseband, the processor 810 may control overall operation of the reception device 800.

The antenna unit 820 includes one or more physical antennas and, when including multiple antennas, supports MIMO transmission and reception. The transceiver 830 includes an RF transmitter and an RF receiver. The memory 840 stores information that results from computation by the processor 810, and software, an operating system, an application, and the like, which are associated with operation of the reception device 800. The memory 590 may include a constituent element such as a buffer.

The processor 810 of the reception device 800 causes the receiver according to the embodiments of the present disclosure to operate.

For example, the higher layer processing unit 811 of the processor 810 of the reception device 800 includes at least one of the following: at least one first layer 812, a second layer 813, or a quantization layer 814.

The processor 810 generates the reception signal vector including the channel component and the noise component, on the basis of a signal received through the antenna unit 820 and the transceiver 830. The reception signal vector is stored in the memory 840.

At least one first layer 812 classify the features of the reception signal vector. For example, each of the first layers 812 is a fully connected layer that has a ReLU function as an activation function.

The reception signal vector or outputs of at least one first layer 812 are input into the second layer 813, and the second layer 813 generates a B-dimensional output value. For example, the second layer 813 may include a fully connected layer that has a nonlinear function (for example, a tanh function) as an activation function.

The reception signal vector, the outputs of at least one first layer 812, or an output of the second layer 813 is input into the quantization layer 814, and the stochastic binarization applies to the quantization layer 814. An estimated gradient is applied in the stochastic binarization. The quantization layer 814 outputs a bit string with a length of B.

The processor 810 generates feedback information from the reception signal vector, using at least one of the following: at least one first layer 812, the second layer 813, or the quantization layer 814.

The processor 810 performs transmission processing (for example, coding, channel coding, physical resource mapping, transmission signal generation, and the like) on the feedback information through the physical layer processing unit 815, and transmits the feedback information to the transmission device 850 through the transceiver 830.

The transmission device 850 includes a processor 860, an antenna unit 870, a transceiver 880, and a memory 890.

The processor 860 performs signal processing associated with a baseband and includes a higher layer processing unit 861 and a physical layer processing unit 865. The higher layer processing unit 861 performs processing associated with a MAC layer, an RRC layer, and a layer higher than these layers. The physical layer processing unit 865 performs processing (for example, transmission/reception signal processing and the like over uplink/downlink/sidelink) associated with a PHY layer. In addition to performing the signal processing associated with the baseband, the processor 860 may control overall operation of the transmission device 860.

The antenna unit 870 includes one or more physical antennas and, when including multiple antennas, supports MIMO transmission and reception. The transceiver 880 includes an RF transmitter and an RF receiver. The memory 890 stores information that results from computation by the processor 860, and software, an operating system, an application, and the like, which are associated with operation of the transmission device 850. The memory 590 may include a constituent element such as a buffer.

The processor 860 of the transmission device 850 causes the transmitter according to the embodiments of the present disclosure to operate.

For example, the higher layer processing unit 861 of the processor 860 of the transmission device 850 includes at least one of the following: at least one third layer 862, a fourth layer 863, or a normalization layer 864.

The processor 860 transmits a signal to the reception device 800 through the transceiver 880 and the antenna unit 870.

The processor 860 receives the feedback information from the reception device 800 through the transceiver 880. The received feedback information is stored in the memory 890.

The feedback information here is generated by the reception device 800 on the basis of a signal component, a channel component, and a noise component that are transmitted from the transmission device 850 to the reception device 800.

At least one third layer 862 classify the features of the feedback information. For example, each of the third layers 862 is a fully connected layer that has a ReLU function as an activation function.

The feedback information or the outputs of at least one third layer 862 are input into the fourth layer 863, and the fourth layer 863 generates a beamforming vector. For example, the fourth layer 864 is a fully connected layer that has a linear function as an activation layer.

The feedback information, the outputs of at least one third layer 862, or an output of the fourth layer 863 are input into the normalization layer 864, and the normalization layer 864 converts a norm value of the beamforming vector into a predetermined value (for example, 1).

The processor 850 generates a codeword from the feedback information, using at least one of the following: at least one third layer 862, the fourth layer 863, or the quantization layer 864. For example, the codeword is derived from the real part vector and imaginary part vector of the beamforming vector.

The reception device 800 and the transmission device 850, which are configured as described above, perform the neural network training process to determine the codebook. Through the neural network training process, the beamforming vector or the codeword that corresponds to each piece of feedback information is determined. In addition, the codebook including at least one codeword is determined.

The codeword or the codebook is derived through the process of training the neural network to maximize the effective channel gain. For the neural network training, the stochastic gradient descent applies.

When the neural network training is completed, the reception device 800 performs an operation similar to the neural network training. For example, when receiving a signal (for example, a pilot signal) from the transmission device 850, the reception device 800 derives the feedback information from the reception signal vector including the channel component and the noise component, using at least one of the following: at least one first layer 812, the second layer 813, or the quantization layer 814.

When the neural network training is completed, the transmission device 850 performs an operation of selecting a codeword (or a beamforming vector) corresponding to the feedback information received from the reception device 800, without performing an operation similar to the neural network training. The feedback information and the codeword (or the beamforming vector) have a one-to-one mapping relationship.

In a case where the reception device 800 and the transmission device 850 are the same in operation as the receiver and the transmitter, respectively, which are described in the examples of the present disclosure, descriptions thereof are omitted.

Figure 9:
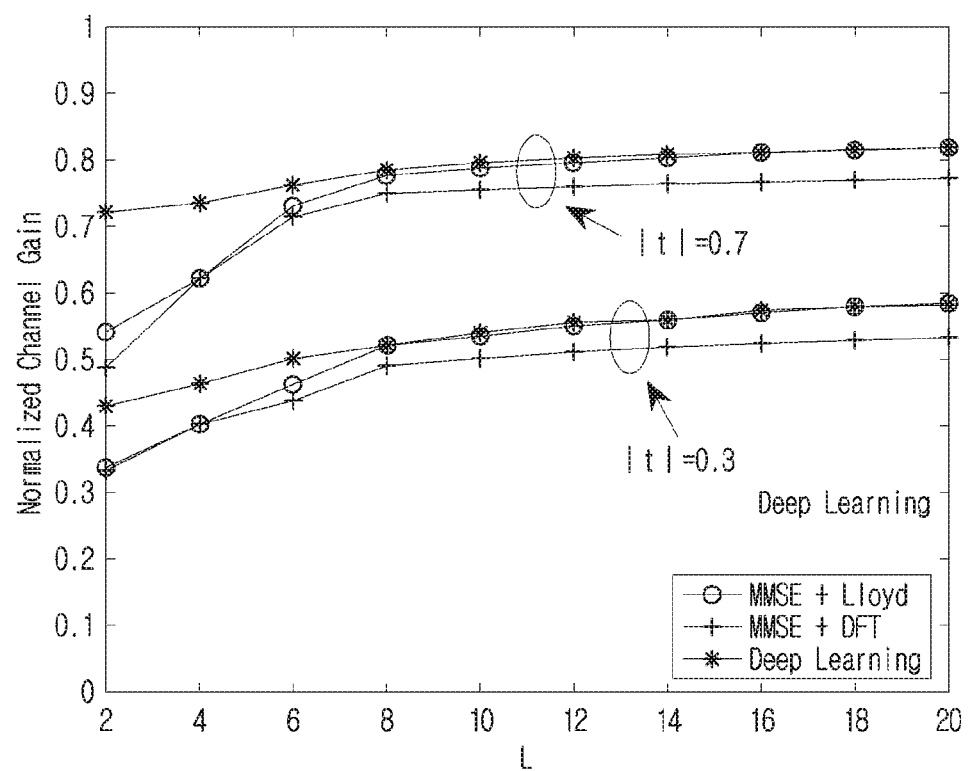
FIGS. 9 and 10 are diagrams each illustrating the result of simulating the limited-feedback system according to the present disclosure.
Figure 10:
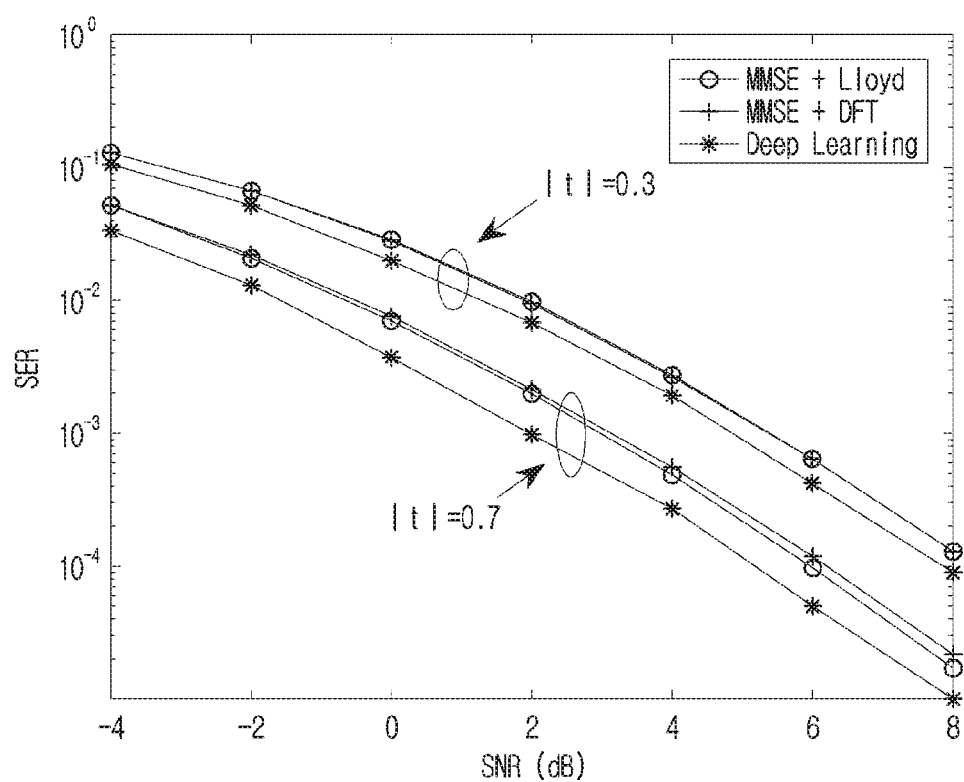

FIGS. 9 and 10 are diagrams each illustrating the result of simulating the limited-feedback system according to the present disclosure.

Pilot signal P in FIGS. 9 and 10 are expressed as in Equation 15.

$$P \triangleq [p_1, \ldots, p_L] \in \mathbb{C}^{N_t \times L} \quad \text{Equation 15}$$

$$P_i \triangleq \frac{1}{\sqrt{N_t}}[1, e^{j2\pi(t-1)/L}, \ldots, e^{j2\pi(t-1)(N_t-1)/L}]^T$$

In Equation 15, it is assumed that pilot signal P is transmitted from the transmitter to the receiver during L time slots. That is, $p_i$ denotes a pilot signal during an i-th time slot. It is assumed that a ratio of a pilot signal to noise during each time slot is constantly set to 0 dB.

In addition, it is assumed that each element of channel matrix H has characteristics of Rayleigh fading. A matrix for correlation between channels is set as in Equation 16.

$$[R_H]_{i,j} = \begin{cases} N_r t^{|i-j|} & \text{for } i < j \\ N_r (t^*)^{|i-j|} & \text{otherwise} \end{cases} \quad \text{Equation 16}$$

In addition, it is assumed that all noise factors have a random Gaussian distribution that has an average value of 0.

In addition, it is assumed that the number of antennas in the transmitter is 8 ($N_t$=8), that the number of antennas in the receiver is 4 ($N_r$=4), and that a bit length of the feedback information is 6 (B=6).

The feedback scheme according to the present disclosure is expressed as a deep learning scheme. An existing feedback scheme that is in contrast with the feedback scheme according to the present disclosure, uses MMSE, the most commonly used channel estimation scheme in accordance with the existing communication theory. Furthermore, a Lloyd scheme (that is, a combination of MMSE and Lloyd schemes), and a DFT codebook scheme (that is, a combination of MMSE and DFT schemes) apply, as the channel estimation scheme, to such an existing feedback scheme.

FIG. 9 illustrates that the channel gain changes with a length of the time slot that is used for the pilot signal. From the result of the simulation in FIG. 9, it can be seen that the feedback according to the present disclosure has the highest performance. Particularly, it can be seen that, when the length of the time slot is smaller than the number of antennas, the feedback according to the present disclosure has a clear performance advantage. From this, it can be understood that because the feature that row vectors intersect in a pilot matrix is not satisfied, estimation is difficult to perform properly in the existing schemes (a combination of MMSE and Lloyd schemes and a combination of MMSE and DFT schemes). In contrast, it can be understood that, even in such a case, high-performance feedback is provided in the scheme (the deep learning) according to the present disclosure.

FIG. 10 illustrates a comparison in terms of a symbol error rate (SER) in accordance with a signal-to-noise ratio (SNR) that results when communication is performed using a beamforming vector obtained through feedback on the assumption that only four time slots are used. A channel is difficult to estimate because the number of time slots is smaller than the number of antennas. Thus, in a case where communication is performed using the existing scheme, a higher error probability occurs in the existing scheme than in the scheme according to the present disclosure.

Table 1 shows the result of simulating computational complexity that results when applying the limited-feedback system (or in an online situation). The existing scheme, such as a combination of MMSE and Lloyd schemes and a combination of MMSE and DFT schemes, requires inverse matrix computation to estimate a channel. Therefore, the longer the time slot, the higher the computational complexity. However, the deep neural network computation according to the present disclosure, which includes simple matrix multiplication, has low computational complexity.

TABLE 1

|                  | L = 2  | L = 5  | L = 10 | L = 20 |
|------------------|--------|--------|--------|--------|
| MMSE + Lloyd, DFT | 0.0625 | 0.0668 | 0.0771 | 0.0981 |
| Deep Learning    | 0.0270 | 0.0286 | 0.0290 | 0.0311 |

Exemplary methods according to the present disclosure are described as a sequence of operations for clear description, but this is not intended to impose any limitation on the order in which steps are performed. If necessary, the steps may be performed simultaneously or in a different order. In order to implement the method according to the present disclosure, one or several other steps may be included in addition to the steps described above. Alternatively, one or several of the steps described above may be omitted. Alternatively, one or several of the steps described above may be omitted, and one or several other steps may be included.

The various embodiments of the present disclosure, which are described above, do not include all possible combinations of the constituent elements and are provided only for descriptions of representative aspects of the present disclosure. The constituent elements described according to the various embodiments may be applied independently or in combination.

In addition, the various embodiments of the present disclosure can be implemented in firmware, in software, or with a combination of these. The various embodiment can be implemented by at least one of the following: Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controllers, micro controllers, microprocessors, and the like.

The scope of the present disclosure includes software or machine-executable commands (for example, an operating system, an application, firmware, a program, and the like) that cause a device or a computer to perform the methods according to the various embodiments, and a non-transitory computer-readable medium on which the software or the commands are recorded in a manner that is executable on the device or the computer.

What is claimed is:

1. A method of feedback in a wireless communication system, the method comprising:
   acquiring by a receiver a reception signal vector including a channel component and a noise component;
   generating by the receiver feedback information by applying at least one of processing through at least one first layer, processing through a second layer, or processing through a quantization layer, to the reception signal vector; and
   transmitting by the receiver the feedback information to a transmitter,
   wherein the quantization includes stochastic binarization, and wherein the stochastic binarization includes, based on a probability that an input of the quantization layer has a first value or a second value in a range from the first value to the second value, making an output of the quantization layer has one of the first value and the second value.

2. The method according to claim 1, wherein the stochastic binarization is expressed using the following equation:

$$b(z) = z + e, \text{ for } z \in [-1, 1]$$

$$e = \begin{cases} 1-z, & \text{with probability } \dfrac{1+z}{2} \\ -1-z, & \text{with probability } \dfrac{1-z}{2} \end{cases}$$

where z denotes an input of the quantization layer, and b(z) denotes an output of the quantization layer.

3. The method according to claim 2, wherein the stochastic binarization uses an estimated gradient according to the following equation:

$$\nabla_{\theta_R} b(z) \simeq \nabla_{\theta_R} \mathbb{E}_e[z+e|z] = \nabla_{\theta_R} z$$

where $\nabla$ denotes a gradient, $\theta_R$ denotes a variable that is used for computation by the receiver, and Ee denotes an estimated value of quantization noise e.

4. The method according to claim 1, wherein the second layer is a fully connected (FC) layer that has a nonlinear function as an activation function.

5. The method according to claim 4, wherein the nonlinear function is a hyperbolic tangent (tanh) function.

6. The method according to claim 1, wherein a dimension of an output value of the second layer is fixed to a predetermined value of B.

7. The method according to claim 6, wherein the feedback information is a bit string of which a length is the predetermined value of B.

8. The method according to claim 1, wherein the first layer is a fully connected (FC) layer that has a rectified linear unit (ReLU) function as an activation function.

9. A method of determining a codeword in a wireless communication system, the method comprising:
transmitting by a transmitter a signal to a receiver;
receiving by the transmitter feedback information generated by the receiver from the receiver; and
generating by the transmitter a codeword by applying at least one of processing through at least one first layer, processing through a second layer, or processing through a normalization layer, to the feedback information,
wherein the feedback information is generated based on a signal component, a channel component, and a noise component, which are transmitted from the transmitter to the receiver,
wherein the feedback information is generated based on at least one of processing through at least one first layer, processing through a second layer, or processing through a quantization layer,
wherein the quantization includes stochastic binarization, and
wherein the stochastic binarization includes, based on a probability that an input of the quantization layer has a first value or a second value in a range from the first value to the second value, making an output of the quantization layer has one of the first value and the second value.

10. The method according to claim 9, wherein the first layer is a fully connected layer that has a rectified linear unit (ReLU) as an activation function.

11. The method according to claim 9, wherein the second layer is a fully connected (FC) layer that has a linear function as an activation function.

12. The method according to claim 9, wherein the processing through the normalization layer includes converting a norm value of a beamforming vector derived from the feedback information into a predetermined value.

13. The method according to claim 9, wherein the codeword is derived from a real part vector and an imaginary part vector of the beamforming vector derived from the feedback information.

14. A method of determining a codebook for feedback in a wireless communication system, the method comprising:
acquiring by a receiver a reception signal vector including a channel component and a noise component, based on a signal received from a transmitter;
generating by the receiver feedback information by applying at least one of processing through at least one first layer, processing through a second layer, or processing through a quantization layer, to the reception signal vector;
transmitting by the receiver the feedback information to the transmitter; and
generating by the transmitter a codeword by applying at least one of processing through at least one third layer, processing through a fourth layer, or processing through a normalization layer, to the feedback information,
wherein the codebook includes one or more of the codewords,
wherein the quantization includes stochastic binarization, and
wherein the stochastic binarization includes, based on a probability that an input of the quantization layer has a first value or a second value in a range from the first value to the second value, making an output of the quantization layer has one of the first value and the second value.

15. The method according to claim 14, wherein the codeword is derived through a process of training a neural network in order to maximize an effective channel gain, and the maximization of the effective channel gain is expressed using the following equation:

$$\max_{\theta_T, \theta_R} \mathbb{E}_{H,N}\left[\|Hg_T(g_R(\tilde{y}^{train}; \theta_R); \theta_T)\|_2^2\right]$$

where E denotes the effective channel gain, H denotes a channel matrix, N denotes a noise matrix, $g_T$ denotes a function representing a relationship between an output and an output in the transmitter, $g_R$ denotes a function representing a relationship between an input and an output in the receiver, $Y^{\sim train}$ denotes a signal received by the receiver from the transmitter, $\theta_T$ denotes a variable that is used from computation by the transmitter, and $\theta_R$ denotes a variable that is used from computation by the receiver.

16. The method according to claim 15, wherein the process of training the neural network includes updating one or both of the respective variables that are used for computation by the transmitter and the receiver, through stochastic gradient descent, and the stochastic gradient descent is expressed using the following equation:

$$\Theta^{[q]} = \Theta^{[q-1]} + \frac{\eta}{|\mathcal{B}|} \sum_{(H,\mathcal{N}) \in \mathcal{B}} \nabla \|Hg_T(g_R(\tilde{y}^{train}; \theta_R); \theta_T)\|_2^2$$

where $\nabla$ denotes a gradient, q denotes the number of times of iteration, B denotes the number of channels, and $\eta$ denotes a ratio at which one or more variables are updated.

17. The method according to claim 15, wherein, when a processing of training the neural network is completed and the feedback is then received from the receiver, the transmitter selects the codeword based on a one-to-one mapping relationship between the feedback information and the codeword.

\* \* \* \* \*